United States Patent [19]

Figge et al.

[11] 4,230,764
[45] Oct. 28, 1980

[54] PRESTRESSED ARTICLE

[75] Inventors: Irving E. Figge, Edward H. Dean, both of Newport News, Va.

[73] Assignee: The United States of America as represented by the Secretary of the Army, Alexandria, Va.

[21] Appl. No.: 34,816

[22] Filed: Apr. 30, 1979

Related U.S. Application Data

[62] Division of Ser. No. 906,186, May 15, 1978, Pat. No. 4,194,938.

[51] Int. Cl.³ .......................... B32B 27/10; B65D 5/56
[52] U.S. Cl. .................................. 428/268; 428/273; 428/417; 428/522
[58] Field of Search .................. 156/196, 212–214, 156/219, 222–224, 285–287, 322; 428/172, 251, 268, 273, 417, 522

[56] References Cited

U.S. PATENT DOCUMENTS

| | | | |
|---|---|---|---|
| 3,054,714 | 9/1962 | Johnston | 156/209 |
| 3,080,267 | 3/1963 | Schmalz | 428/522 |
| 3,446,686 | 5/1969 | Butler et al. | 156/285 |
| 3,654,012 | 4/1972 | Schlager | 156/212 |
| 3,697,369 | 10/1972 | Amberg et al. | 156/212 |
| 3,931,836 | 1/1976 | Thiele | 428/522 |

*Primary Examiner*—John E. Kittle
*Attorney, Agent, or Firm*—Nathan Edelberg; Robert P. Gibson; Norman L. Wilson, Jr.

[57] ABSTRACT

Thermoforming, utilized for making articles from sheets of thermoplastic resins, does not readily yield articles having desired strength properties. Using both thermoplastic and thermosetting resins in the process results in articles embodying fabrication stresses akin to those in prestressed concrete.

1 Claim, 3 Drawing Figures

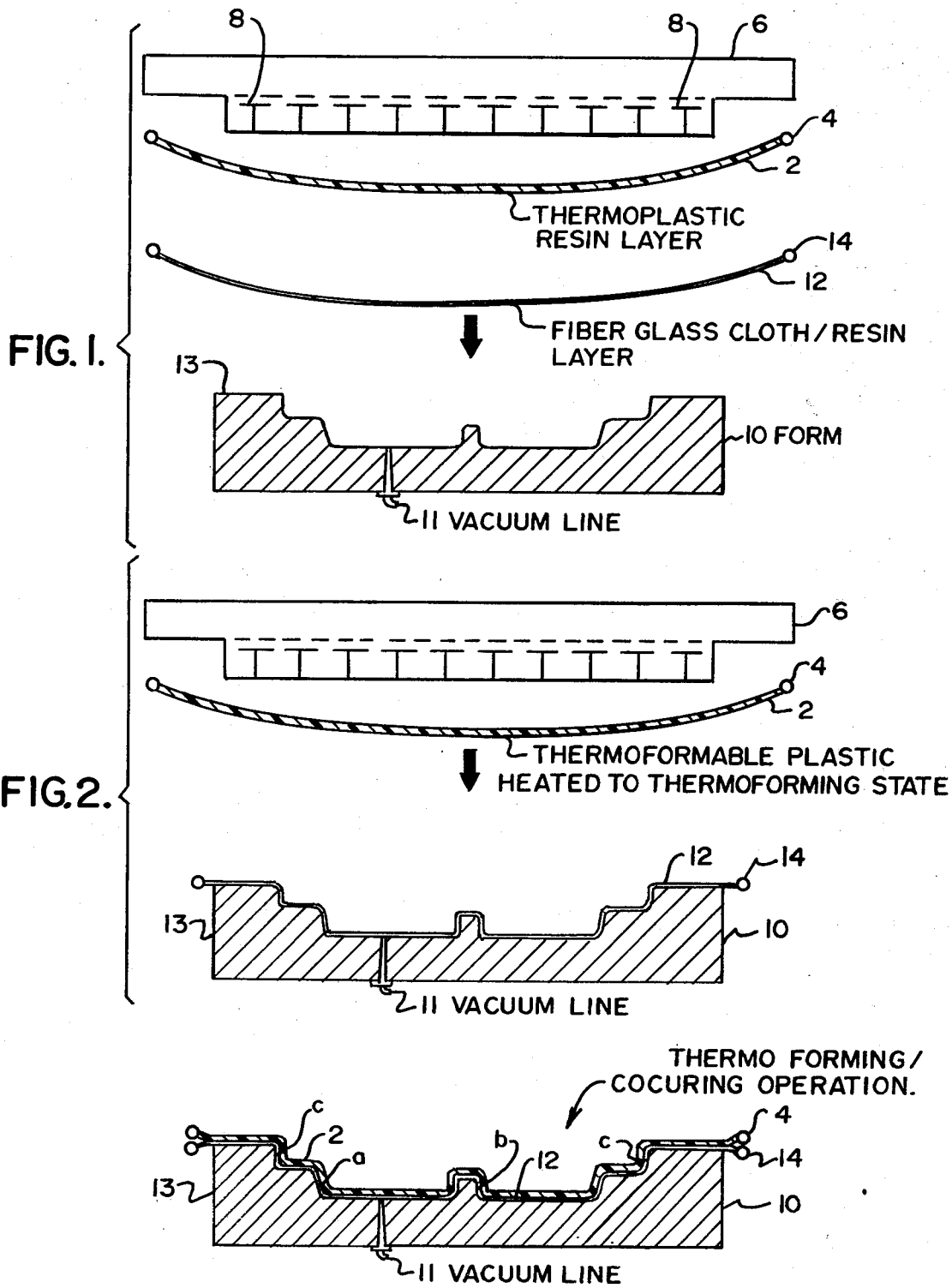

PRESTRESSED ARTICLE

This is a division, of application Ser. No. 906,186, filed May 15, 1978, now U.S. Pat. No. 4,194,938.

BACKGROUND OF THE INVENTION

This invention relates a process for thermoforming prestressed plastic articles, and to articles made by the process.

In thermoforming, a sheet of thermoplastic resin is clamped into a clamp frame and heated. An oven or heat station is utilized, which heats the edges as well as the center of the thermoplastic sheet so that, when it is subsequently delivered to a forming station, an overall temperature balance has been attained. After heating, the sheet is conveyed to the forming station where by one of several methods, it is forced over a mold. In any thermoforming operation residual heat of the plastic must be removed as quickly as possible after forming. After cooling the end product is removed from the forming station and sent to a trim press where it is trimmed from the web.

It can be seen that the thermoforming operation is utilized for making articles from sheets of thermoplastic resins, for example, acrylics (acrylonitrile polymers), polycarbonates, polyesters, polyimides, polypropylene, polystyrene and polyvinyl alcohol. One of the disadvantages of the process is that, using thermoplastic resins, it is not always possible to obtain the strength properties desired. As an example, thermoforming has been attempted for bodies of certain airborne objects. However it was found that such bodies readily cracked on landing. In accordance with the practice of this invention a thermoforming process has been developed which leads not only to plastic articles having better strength properties, but to prestressed plastic articles.

SUMMARY OF THE INVENTION

As can be seen thermoforming is used for molding articles from thermoplastic resins, the reason being that thermoforming apparatus has been developed to utilize sheets of plastic, of say 0.03 to 0.5 inches thick.

We have found that thermosetting materials, such as a weft of glass, steel, plastic (polyamide), or graphite fibers impregnated with a thermosetting resin, can be employed in thermoforming operations. For example, alkyd resins, epoxy resins, and urea or melamine aldehyde resins (amino resins) can be used if laminates are formed consisting of alternate thermoplastic and fiber reinforced thermoset resin layers. The laminate is formed so that its bottom layer, which will lay on the mold, is a sheet of fiber reinforced thermoset resin. The superimposed thermoplastic layer forces the thermosetting resin layer over the mold as the vacuum is created. On being removed from the mold, and on being post cured at a low temperature if necessary, the molded articles were found to possess greater strength properties than similarly thermoformed thermoplastic articles. Quite surprisingly, they were also found to embody fabrication stresses akin to those in prestressed concrete.

DETAILED DESCRIPTION OF THE INVENTION

Although thermoforming techniques have remained relatively unchanged over the years, there are about nine available thermoforming processes which have resulted from improvements. The differences in the processes depend upon whether a male or female mold is utilized, and upon how the vacuum, which draws the thermoplastic sheet over the mold, is supplemented, for instance, plug assist, snap-back, pressure bubble and trapped sheet forming. All the processes, however, result in a molded article having a thickness distribution unlike the original thermoplastic sheet. The sheet stretches here and there, depending upon the shape of the mold, sometimes as much as 40 per cent. This invention is based on the fact in the case of laminae the thermosetting and thermoplastic layers have different degrees of expansion growth. These elastic differences result in fabrication stresses, that is in prestressing.

In order better to illustrate the invention we will now consider a preferred embodiment thereof in conjunction with the accompanying drawings. The drawings are diagramatic in nature in which:

FIG. 1 shows the entire thermoforming apparatus;

FIG. 2 shows the first stage of the thermoforming process and

FIG. 3 shows the vacuum stage of the thermoforming process.

Referring now to FIG. 1, a cut sheet 2, of thermoplastic material is secured in a clamp frame 4, which is automatically raised to heat station 6. The heat station is an over containing radiant heating elements 8, positioned above a mold or form 10 provided with a vacuum line 11. Between clamp frame 4 and mold 10 is a second clamp frame 14 adapted to hold a lower sheet or layer 12. The upper sheet 2 is a sheet of an acrylonitrile-butadrene-styrene thermoplastic resin (ABS). The lower sheet 12 is a layer of glass fiber cloth impregnated with a liquid epoxide resin, that is, a low viscosity liquid glycidyl polyether of bisphenol having an epoxide equivalent of 190. The epoxy resin is combined with sufficient diethylene triamine to react with the epoxy groups to effect a cure. During operation the thermoplastic is heated and transfers its heat to the thermoset material as contact occurs during vacuum forming. After heating, sheets 2 and 12 are indexed onto forming station 10 to form laminated end products.

As seen in the drawings forming station 10 contains a mold 13 which is either a female member as shown, or a male member. Vacuum and pressure are the primary means employed to draw the plastic material into the required configuration. Clamp frame 14 is first lowered to forming station 10 where it seats as shown in FIG. 2. As the hermetic condition is created, the softened thermoplastic layer is superimposed thereon by lowering clamp frame 4. The vacuum beneath the sheets results in atmospheric pressure pushing the thermoplastic layer over the epoxy resin layer to form a laminated sheet on the mold as shown in FIG. 3. When a sheet is drawn over a mold there is conventionally a certain thickness distribution. That part of the sheet touching the mold first remains close to its original thickness. As the sheet is drawn onto the mold it clings to the first places it touches, particularly bend points, and then stretches so that areas of the sheet reaching the mold last, such as points a, b and c in FIG. 3 are thinner than other areas.

Advantage is taken herein of the fact that thermoforming processes result in this variable thickness distribution. The epoxy resin glass cloth layer 12 does not stretch during the thermoforming operation to the same extent as does the thermoplastic (ABS) layer 2. Equally important, as the layers cool the thermoplastic layer contracts whereas the thermoset layer does not.

Since this contraction takes place during curing additional stresses are developed.

The difference in expansive growth of the two layers during the forming and cooling operations results in the tensile stresses, forming the prestressed laminated plastic. The result is a thermoformed article in the form of a three dimensionally curved surface, embodying laminae of alternate epoxy resin layers fused to thermoplastic resin layers. Each epoxy resin layer is an epoxy resin impregnated high tensile strength fiberous weft, the epoxy resin layers being pretensiled by stresses developed during thermoforming.

As indicated previously liquid resins are contemplated herein in order to impregnate the fibrous weft. Liquid epoxide resins are those glycidyl polyethers having epoxide equivalent weights below 250. A thermoset resin cannot be formed at this stage. The epoxyfiber layer 12 must be only partially cross-linked in heat station 6. The cross-linking reaction effecting final curing occurs on the mold or shortly thereafter. Otherwise glass fiber-epoxy layer 12 would not follow the mold and the sheet could not be molded. Epoxy resin crosslinking agents such as some of the anhydrides which require high temperature curing are not suitable. Those anhydrides and boren trifluorides which require 24 hours for the crosslinking reaction also are not practical. Desirable curing agents are those with curing periods of less that one hour, preferably the amine crosslinking agents.

It is thus apparent that this invention provides for desirable prestressed articles having boron, steel, carbon, plastic, inorganic fibers, or glass fibers embedded therein, even though thermoforming techniques are employed. It can be seen that a wide variety of thermoplastic and thermosetting resins are available, so long as they are compatible. This, of course, excludes the polyaklenes such as polyethylene and polypropylene. Variations in the thermoforming process and the equipment in which it is carried out will also occur to those skilled in the art. Such ramifications and modifications are deemed to be within the scope of this invention.

What is claimed is:

1. A thermoformed article in the form of a three dimensionally curved surface embodying laminae of alternate epoxy resin layers fused to thermoplastic resin layers, each epoxy resin layer being an epoxy resin-impregnated high tensile strength fiberous weft, each thermoplastic resin layer being an acrylonitrile polymer, the epoxy resin layers being pretensiled by stresses developed during thermoforming.

* * * * *